United States Patent Office 3,529,921
Patented Sept. 22, 1970

3,529,921
PROCESS FOR DYEING OR PRINTING SYNTHETIC FIBERS WITH BASIC AZO DYESTUFFS
Gert Hegar, Basel, Switzerland, and Hugo Illy, Toms River, N.J., assignors to Ciba Limited, Basel, Switzerland, a Swiss company
No Drawing. Filed May 2, 1967, Ser. No. 635,333
Claims priority, application Switzerland, May 11, 1966, 6,882/66; Mar. 8, 1967, 3,389/67
Int. Cl. D06p 1/08
U.S. Cl. 8—41             16 Claims

ABSTRACT OF THE DISCLOSURE

Process for coloring synthetic textile fibres, e.g. polyacrylonitrile and polyvinylidenecyanide with basic azodyestuffs containing a tertiary or quaternary heterocyclic amine bound via its nitrogen atom to an alkyl-amino group bound to the coupling component in para-position to the azo-bridge.

---

The present invention provides a process for dyeing and printing materials in the form of fibres, films, threads or tapes made of or containing fully synthetic fibres, for example linear polyesters of aromatic dicarboxylic acids, for example polyethylene terephthalate or polymers or copolymers of asymmetric dicyanoethylene or acrylonitrile. The term "dyeing" as used hereinafter includes also local dyeing as practised in textile printing.

The process of the invention consists in the use of azo dyes that are free from sulphonic acid and carboxylic groups and that correspond to the formula (1) 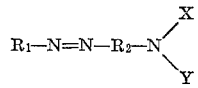

where $R_1$ represents the residue of a diazo component which is advantageously free from azo groups and, when it contains a halogen atom in 2-position to the azo linkage and an alkanecarbonyl, alkanesulphonyl or alkylated aminosulphonyl group in the 4-position must not contain a further halogen atom in 5- or 6-position and, when it contains a halogen atom in 2-position and a nitro group in 4-position must not contain a nitro group in 6-position to the azo linkage; $R_2$ represents a benzene residue linked with the azo linkage in para-position to the amino group; X represents a hydrogen atom, an alkyl, aryl, aralkyl or cycloalkyl group which may be substituted and Y represents an alkylene radical which is directly connected through an alkyl carbon atom with the cyclic nitrogen atom of a heterocyclic tertiary or quaternary amine, and wherein N and X together with $R_2$ may form a heterocycle.

The dyestuffs of this invention are mostly known compounds (see, for example, German specification 652,215) and are accessible, for example, by coupling diazotised amines of the formula $R_1$—$NH_2$ with the corresponding coupling components.

As coupling components suitable for use as starting materials and corresponding to formula (2) 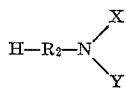

the following examples may be mentioned

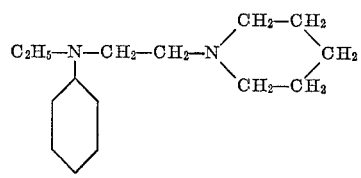

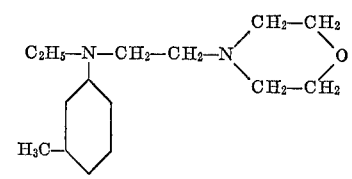

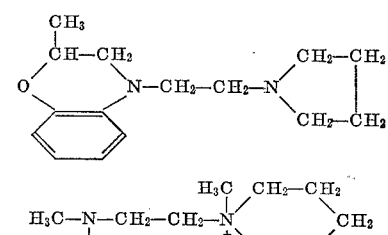

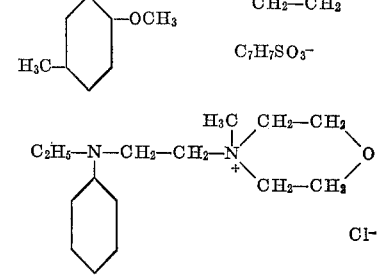

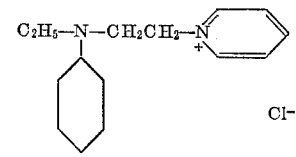

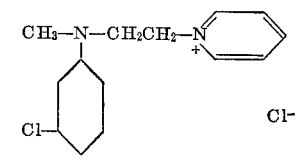

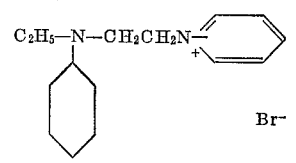

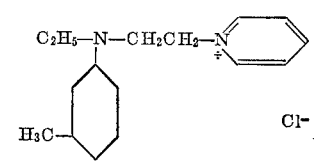

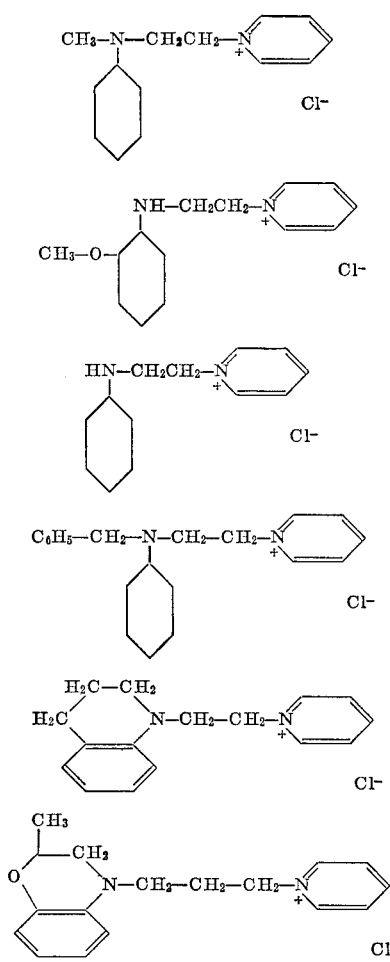

As examples of diazo components, those of the aromatic series may be particularly mentioned, for example, those of the naphthalene and especially of the benzene series. These components correspond, for example, to the formula

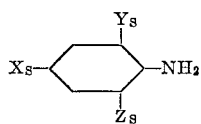

where $X_S$ represents a hydrogen or halogen atom, a cyano, carbalkoxy, alkanesulphonyl, sulphonamide, phenylazo or nitro group, $Y_S$ a hydrogen or halogen atom, a nitro, alkyl, alkoxy, trifluoromethyl, carbalkoxy or cyano group, $Z_S$ a hydrogen or halogen atom, and at least one of the residues $X_S$ or $Y_S$ stands for a halogen atom, a nitro, carbalkoxy, cyano, alkylsulphonyl, sulphonamido or phenylazo group.

As examples the following aminobenzenes may be mentioned:

1-amino-3- or -4-chlorobenzene,
1-amino-4-bromobenzene,
1-amino-2-, -3- or -4-methylbenzene,
1-amino-2-, -3- or -4-nitrobenzene,
1-amino-4-cyanobenzene,
1-aminobenzene-3- or -4-methylsulphone,
1-amino-2,5-dicyanobenzene,
1-amino-4-carbalkoxybenzene,
1-amino-2,4- or -2,5-dichlorobenzene,
1-amino-2,4-dibromobenzene,
1-amino-2-methyl-4- or -6-chlorobenzene
1-amino-2-trifluoromethyl-4-chlorobenzene,
1-amino-2-cyano-4-chlorobenzene,
1-amino-2-cyano-4-nitrobenzene,
1-amino-2-carbomethoxy-4-chlorobenzene,
1-amino-2-methanesulphonyl-4-chlorobenzene,
1-amino-2-carbomethoxy-4-nitrobenzene,
1-amino-2-phenoxy-4-nitrobenzene,
1-amino-2-chloro-4-cyanobenzene,
1-amino-2-chloro-4-nitrobenzene,
1-amino-2-methoxy-4-nitrobenzene,
1-amino-2-chloro-4-carbethoxybenzene,
1-amino-2,4-dinitrobenzene,
1-amino-2,4-dicyanobenzene,
1-amino-2,6-dichloro-4-cyanobenzene,
1-amino-2,6-dichloro-4-nitrobenzene,
1-amino-2,6-dibromobenzene-4-sulphonamide,
1-amino-2,4-dicyano-6-chlorobenzene,
1-amino-2,4,6-trichlorobenzene or -tribromobenzene,
1-aminobenzene-3- or -4-sulphonamide,
1-aminobenzene-3- or -4-sulphonic acid-N-methyl- or diethylamide,
4-amino-3-chlorobenzenesulphonic acid diethylamide,
4-aminoazobenzene,
4-amino-2'-chloroazobenzene,
4-amino-2',4'-dichloroazobenzene,
4-amino-3'-chloroazobenzene,
4-amino-2'-nitroazobenzene,
2-amino-5-nitrophenyl-methylsulphone,
1-aminobenzene-4-carboxylic acid-β-methoxyethyl ester,
4-amino-3-nitroazobenzene,
4-amino-3'-nitroazobenzene,
4-amino-2-methylazobenzene,
4-amino-4'-methoxyazobenzene,
4-amino-3-nitro-2'-chloroazobenzene,
4-amino-3-nitro-4'-chloroazobenzene,
4-amino-3-nitro-2',4'-dichloroazobenzene,
4-amino-3-nitro-4'-methoxyazobenzene,
4-aminodiphenyl, and
2- or 4-aminodiphenyl ether.

The above-mentioned diazo components may be diazotized by known methods, for example with a mineral acid, especially hydrochloric acid, and sodium nitrite.

The coupling may likewise be carried out in known manner, in a neutral to acid medium, if desired or required in the presence of sodium acetate or a similar buffer substance capable of accelerating the coupling reaction or of a catalyst, for example pyridine or a pyridine salt.

The coupling components of the Formula 2 may be obtained by condensing the corresponding compound wherein the residue Y contains a halogen atom or an ester grouping instead of the cyclic amino residue, with a secondary or tertiary heterocyclic amine, for example pyridine.

The azo dyes to be used according to this invention may also be manufactured by condensing an azo compound corresponding to the azo dye of the Formula 1, wherein the residue Y contains a halogen atom or an ester grouping instead of the cyclic amino residue, with a secondary or tertiary heterocyclic amine, for example, pyridine, picoline, lutidine, piperidine, dimethylcyclohexylamine, piperazine, morpholine, thiomorpholine, quinoline, pyrimidine or pyrrolidine. Alternatively, when azo dyes containing a quaternary cyclic amino residue are to be manufactured in which amino residue the nitrogen atom is not bound to a double bond, by quaternating the corresponding compound containing a tertiary amino residue with a quaternating agent, for example dimethyl sulphate, diethyl sulphate, an alkyl halide, for example methyl chloride, bromide or iodide, an aralkyl halide, for example benzyl chloride, an ester of a lower alkanesulphonic acid, for example a methyl ester of methanesulphonic, ethanesulphonic or butanesulphonic acid, and esters of benzenesulphonic acids which may contain additional substituents, for example methyl, ethyl, propyl or butyl esters of benzenesulphonic acid, of 2- or 4-methylbenzenesulphonic acid, 4-chlorobenzenesulphonic acid or 3- or 4-nitrobenzenesulphonic acid.

The azo dyes containing a quaternated cyclic amino group, which are to be used according to this invention, provided they are in the form of salts of strong inorganic or organic acids capable of forming more or less neutral aqueous solutions, are suitable for dyeing from a weakly alkaline, neutral or weakly acid dyebath. It is advantageous to use an acid bath, either by adding the requisite acid, for example acetic, formic, tartaric, a naphthalene sulphonic acid, an alkali metal bisulphate sulphuric acid, an acid alkali metal phosphate or phosphoric acid, to the dyebath at the start or by adding to the dyebath substances that liberate acid during the dyeing process. Suitable acid donors are, for example, salts of volatile bases with strong non-volatile acids, for example ammonium sulphate, or water-soluble esters of organic acids which are hydrolyzed during the dyeing process, for example the methyl or ethyl esters of aliphatic hydroxy acids, for example lactic, malic or tartaric acid. When dyeing is to be performed with a mineral acid solution of a dyestuff according to this invention, it is possible, if desired, to neutralize the mineral acid during the dyeing process by the gradual addition of alkali metal salts of weaker acids, for example with sodium acetate. Dyeing is carried out at an elevated temperature in an uncovered boiling dyebath or in a closed vessel under pressure at a temperature of over 100° C.

The azo dyes to be used according to this invention, especially the monoazo dyes, are suitable for dyeing and printing materials made of or containing a wide variety of fully synthetic fibres, for example fibres of polyvinyl chloride, polyamides or polyurethanes, also fibres of polyesters of aromatic dicarboxylic acids, for example polyethylene terephthalate fibres, and more especially polyacrylonitrile fibres and polyvinylidenecyanide fibres (Darvan). The term polyacrylonitrile fibres includes in particular polymers containing more than 80%, for example 80 to 95% of acrylonitrile; in addition they contain 5 to 20% of vinyl acetate, vinyl chloride, vinyl pyridine, vinylidene chloride, acrylic acid, acrylic acid esters, methacrylic acid, methacrylic acid esters and the like. These products are marketed, for example, under the following trademarks: Acrilan 1656 (The Chemstrand Corporation, Decatur, Ala., U.S.A.), Acrilan 41 (The Chemstrand Corporation), Creslan (American Cyanamide Company), Orlon 44 (Du Pont), Crylor HH (Soc. Rhodiacéta SA, France), Leacryl N (Applicazioni Chimice Società per Azioni, Italy), Dynel (Union Carbide Chem. Corporation), Exlan (Japan. Exland Industry Co., Japan), Vonnel (Mitsubishi, Japan), Verel (Tennessee Eastman, U.S.A.), Zefran (Dow Chemical, U.S.A.), Wolcrylon (Filmfabrik Agfa, Wolfen), Ssaniw (U.S.S.R.) and also orlon 42, Dralon, Courtelle and others.

On these fibres, or on mixtures of two or more of them, the dyestuffs used according to the invention produce intense and level dyeings having good light and general fastness properties, especially good fastness to washing, perspiration, sublimation, creasing, decatizing, ironing, rubbing, carbonizing, water, seawater, dry cleaning agents, over-dyeing and solvents. Inter alia, the dyestuffs used according to this invention have also good stability within a rather wide pH range, and good affinity, for example in aqueous solutions of different pH values. Moreover, the dyestuffs reserve well on wool and other natural or synthetic polyamide fibres.

The quaternated water-soluble dyestuffs are in general almost insensitive to electrolytes and some of them have a distinctly good solubility in water and organic solvents. Dyeing with the quaternated water-soluble dyestuffs is as a rule carried out in an aqueous, neutral or acid medium, at the boil under atmospheric pressure, or in a closed vessel at an elevated temperature under superatmospheric pressure. The conventional commercial levelling agents have no deleterious effect, if used, but they are not required.

The above-described dyestuffs are particularly suitable for trichromatic dyeing. Furthermore, by virtue of their stability towards hydrolysis they may be advantageously used in high-temperature dyeing and for dyeing in the presence of wool. They may also be applied to the fibrous materials by printing; for this purpose there is used, for example, a printing paste which contains the dyestuff and the assistants generally used in printing, for example wetting and thickening agents.

The non-water soluble dyestuffs containing a tertiary amino group, used according to this invention are advantageously used in a finely disperse form with addition of a dispersant, for example soap, sulphite cellulose waste liquor or a synthetic detergent, or a combination of different wetting and dispersing agents. As a rule it is advantageous to convert these dyestuffs, before dyeing, into dye preparations containing a dispersant and the finely disperse dyestuff in a form such that a fine dispersion is obtained when the dyestuff preparation is diluted with water. Such dyestuff preparations can be manufactured in known manner, for example by reprecipitation of the dyestuff from sulphuric acid and grinding the resulting suspension with sulphite cellulose waste liquor. If desired the dyestuff may also be ground in a highly efficient mill in the dry or wet form, with or without addition of a dispersant during the grinding operation. They are also suitable for dyeing and printing a wide variety of fully synthetic fibres, for example polyacrylonitrile fibres, polyvinylchloride fibres, polyamide or polyurethane fibres, and especially fibres of polyesters of aromatic dicarboxylic acids, for example polyethylene terephthalate fibres.

When deep shades are required, for example on polyethylene terephthalate fibres, it is advantageous to add to the dyebath a swelling agent, or to perform the dyeing operation under superatmospheric pressure at a temperature above 100° C., for example at 120° C. Suitable swelling agents are aromatic carboxylic acids, for instance benzoic or salicylic acid, phenols, for example ortho- or para-hydroxydiphenyl, aromatic halogen compounds for example chlorobenzene, ortho-dichlorobenzene or trichlorobenzene, phenylmethylcarbinol or diphenyl. When dyeing under superatmospheric pressure it is advantageous to adjust the dyebath to a weakly acid pH value, for instance by adding a weak acid, for example acetic acid.

The dyestuffs to be used according to this invention lend themselves particularly well to dyeing by the so-called thermofixing process according to which the fabric to be dyed is impregnated with an aqueous dispersion of the dyestuff, which advantageously contains 1 to 50% of urea and a thickener, especially sodium alginate, preferably at a temperature not exceeding 60° C., whereupon the impregnated fabric is squeezed in the usual manner, advantageously so that the impregnated fabric retains 50 to 100% of its initial weight of dye liquor.

For fixing the dyestuff the fabric impregnated in this manner is heated—advantageously after drying, for example in a current of warm air—to a temperature above 100° C., for example to 180 to 210° C.

The above-mentioned thermofixing process is particularly valuable for dyeing mixed weaves containing polyester fibres and cellulose fibres, especially cotton. For this purpose the padding liquor contains in addition to the dyestuff used according to this invention a dyestuff suitable for dyeing cotton, for example a direct dyestuff or vat dye or especially a so-called reactive dyestuff, that is to say a dyestuff that can be fixed on the cellulose fibres by formation of a chemical bond, for instance, a dyestuff containing a chlorotriazine or chlorodiazine residue. In the latter case it is advantageous to add to the padding liquor an acid acceptor, for example an alkali metal carbonate, phosphate, borate or perborate or a mixture of such compounds. When vat dyes are used, the padded fabric must be treated, after the heat treatment, with an aqueous alkaline solution of one of the reducing agents generally used in vat dyeing.

The dyeings obtained by the present process on polyester fibres are advantageously subjected to an after-treatment, for example by heating with an aqueous solution of a non-ionic detergent.

The present process is also suitable for dyeing mixed weaves containing polyester fibres and wool, the wool portion remaining reserved so that it can subsequently be dyed with a wool dye.

Instead of applying the afore-mentioned dyestuffs to the fabric by impregnation, they can be applied by a printing process. For this purpose there is used, for example, a printing paste which contains the finely disperse dyestuff, if desired in admixture with one of the above-mentioned cotton dyes, if desired or required in the presence of urea and/or an acid acceptor together with the conventional printing assistants, for example wetting and thickening agents.

The present process gives strong dyeings and prints having distinguished fastness properties, especially good fastness to light, sublimation, decatizing, washing and washing in the presence of chlorine. Another advantage is the good wool and cotton reserving properties of the dyestuffs to be used in the present process.

The dyestuffs to be used according to this invention, especially those containing a quaternated amino group, are also suitable for the bulk colouration of acrylonitrile polymers and other synthetic materials or solutions thereof, in shades that are fast to light and washing.

Unless otherwise indicated, parts and percentages in the following examples are by weight.

EXAMPLE 1

1 part of the dyestuff of the formula

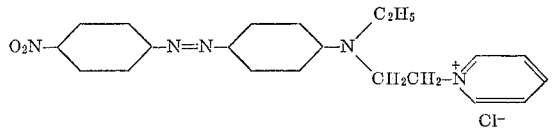

is dissolved in 5,000 parts of water containing 2 parts of 40% acetic acid. Then 100 parts of dried yarn made from polyacrylonitrile staple fibres are immersed in this dyebath at 60° C., the temperature is raised to 100° C. within ½ hour and dyeing is continued for 1 hour at the boil. The dyed yarn is then thoroughly rinsed and dried. The resulting orange yarn has very good fastness to light, sublimation and washing.

The following table lists a number of further dyestuffs that dye polyacrylonitrile fibres by the process described above and the shades obtained:

TABLE

| Dyestuff | Shade |
|---|---|
| 1 | Yellow. |
| 2 | Reddish yellow. |
| 3 | Orange. |
| 4 | Reddish yellow. |
| 5 | Red. |
| 6 | Do. |
| 7 | Scarlet. |
| 8 | Yellow-brown. |
| 9 | Claret. |
| 10 | Do. |

3,529,921

TABLE—Continued

| Dyestuff | | Shade |
|---|---|---|
| 11 | [2,5-dichlorophenyl-N=N-phenyl-N(C$_2$H$_5$)(C$_2$H$_4$-pyridinium)] Cl$^-$ | Yellow. |
| 12 | [4-O$_2$N-phenyl-N=N-phenyl-N(C$_2$H$_5$)(C$_2$H$_4$-pyridinium)] Cl$^-$ | Do. |
| 13 | [O$_2$N-(2,6-Cl$_2$)phenyl-N=N-phenyl-N(C$_2$H$_5$)(C$_2$H$_4$-pyridinium)] Cl$^-$ | Yellow-brown. |
| 14 | [(2,4,6-Cl$_3$)phenyl-N=N-phenyl-N(CH$_3$)(C$_2$H$_4$-pyridinium)] Br$^-$ | Yellow. |
| 15 | [(H$_3$C)$_2$N-CO-phenyl-N=N-phenyl-N(C$_2$H$_5$)(C$_2$H$_4$-pyridinium)] Cl$^-$ | Do. |
| 16 | [H$_2$NO$_2$S-(2,3-Br$_2$)phenyl-N=N-phenyl-N(C$_2$H$_5$)(C$_2$H$_4$-pyridinium)] Cl$^-$ | Do. |
| 17 | [2-NO$_2$-phenyl-N=N-phenyl-N(CH$_3$)(C$_2$H$_4$-pyridinium)] Cl$^-$ | Reddish yellow. |
| 18 | [CH$_3$OCH$_2$CH$_2$O-CO-phenyl-N=N-phenyl-N(C$_2$H$_5$)(C$_2$H$_4$-pyridinium)] Br$^-$ | Yellow. |
| 19 | [O$_2$N-(SO$_2$CH$_3$)phenyl-N=N-phenyl-N(C$_2$H$_5$)(C$_2$H$_4$-pyridinium)] Cl$^-$ | Claret. |
| 20 | [O$_2$N-(O-phenyl)phenyl-N=N-phenyl-N(C$_2$H$_5$)(C$_2$H$_4$-pyridinium)] Cl$^-$ | Red. |
| 21 | [(2,5-Cl$_2$)phenyl-N=N-(3-CH$_3$)phenyl-N(C$_2$H$_5$)(C$_2$H$_4$-pyridinium)] Cl$^-$ | Yellow. |
| 22 | [O$_2$N-phenyl-N=N-phenyl-N(C$_2$H$_5$)(C$_2$H$_4$-pyridinium)] Cl$^-$ | Orange. |
| 23 | [O$_2$N-(Cl)phenyl-N=N-(CH$_3$)phenyl-N(C$_2$H$_5$)(C$_2$H$_4$-pyridinium)] Cl$^-$ | Red. |
| 24 | [O$_2$N-(Cl$_2$)phenyl-N=N-(CH$_3$)phenyl-N(C$_2$H$_5$)(C$_2$H$_4$-pyridinium)] Cl$^-$ | Brown. |

TABLE—Continued

| Dyestuff | | Shade |
|---|---|---|
| 25 | [O₂N—⌬(CN)—N=N—⌬(CH₃)—N(C₂H₅)(C₂H₄—N⁺⌬pyr)] Cl⁻ | Claret. |
| 27 | [CH₃SO₂—⌬(Cl)—N=N—⌬(CH₃)—N(CH₃)(C₂H₄—N⁺⌬pyr)] Cl⁻ | Orange. |
| 28 | [CH₃SO₂—⌬(Cl)—N=N—⌬—N(C₂H₅)(C₂H₄—N⁺⌬pyr)] Cl⁻ | Do. |
| 29 | [O₂N—⌬(NO₂)—N=N—⌬(CH₃)—N(C₂H₅)(C₂H₄—N⁺⌬pyr)] Cl⁻ | Claret. |
| 30 | [O₂N—⌬—N=N—⌬(CH₃)—N(CH₃)(C₂H₄—N⁺⌬pyr)] Cl⁻ | Orange. |
| 31 | [O₂N—⌬(Cl)—N=N—⌬—N(CH₃)(C₂H₄—N⁺⌬pyr)] Cl⁻ | Red. |
| 32 | [O₂N—⌬(Cl,Cl)—N=N—⌬—N(CH₃)(C₂H₄—N⁺⌬pyr)] Cl⁻ | Yellow Brown. |
| 33 | [O₂N—⌬(CN)—N=N—⌬—N(CH₃)(C₂H₄—N⁺⌬pyr)] Cl⁻ | Claret. |
| 34 | [O₂N—⌬(NO₂)—N=N—⌬—N(CH₃)(C₂H₄—N⁺⌬pyr)] Cl⁻ | Do. |
| 35 | [O₂N—⌬—N=N—⌬—N(CH₂—⌬)(C₂H₄—N⁺⌬pyr)] Cl⁻ | Orange. |
| 36 | [O₂N—⌬(Cl)—N=N—⌬—N(CH₂—⌬)(C₂H₄—N⁺⌬pyr)] Cl⁻ | Red. |
| 37 | [O₂N—⌬(Cl,Cl)—N=N—⌬—N(CH₂—⌬)(C₂H₄—N⁺⌬pyr)] Cl⁻ | Yellow Brown. |
| 38 | [O₂N—⌬(CN)—N=N—⌬—N(CH₂—⌬)(C₂H₄—N⁺⌬pyr)] Br⁻ | Claret. |
| 39 | [O₂N—⌬(SO₂CH₃)—N=N—⌬—N(CH₂—⌬)(C₂H₄—N⁺⌬pyr)] Cl⁻ | Do. |

TABLE—Continued

| Dyestuff | | Shade |
|---|---|---|
| 40 | [CH₃SO₂—⌬(Cl)—N=N—⌬—N(CH₂C₆H₅)(C₂H₄—N⁺C₅H₅)] Cl⁻ | Yellow. |
| 41 | [O₂N—⌬(Cl)—N=N—⌬(Cl)—N(CH₃)(C₂H₄—N⁺C₅H₅)] Cl⁻ | Red. |
| 42 | [O₂N—⌬(Cl,Cl)—N=N—⌬(Cl)—N(CH₃)(C₂H₄—N⁺C₅H₅)] Cl⁻ | Yellow-brown. |
| 43 | [O₂N—⌬(CN)—N=N—⌬(Cl)—N(CH₃)(C₂H₄—N⁺C₅H₅)] Cl⁻ | Claret. |
| 44 | [O₂N—⌬(SO₂CH₃)—N=N—⌬(Cl)—N(CH₃)(C₂H₄—N⁺C₅H₅)] Cl⁻ | Do. |
| 45 | [O₂N—⌬(NO₂)—N=N—⌬(Cl)—N(CH₃)(C₂H₄—N⁺C₅H₅)] Cl⁻ | Do. |
| 46 | [O₂N—⌬(Cl,Cl)—N=N—⌬(OCH₃)—N(H)(C₂H₄—N⁺C₅H₅)] Br⁻ | Yellow-brown. |
| 47 | [O₂N—⌬—N=N—⌬(OCH₃)—N(H)(C₂H₄—N⁺C₅H₅)] Cl⁻ | Orange. |
| 48 | [O₂N—⌬(SO₂CH₃)—N=N—⌬(OCH₃)—N(H)(C₂H₄—N⁺C₅H₅)] Cl⁻ | Claret. |
| 49 | [O₂N—⌬(Cl)—N=N—⌬(OCH₃)—N(CH₃)(C₂H₄—N⁺C₅H₅)] Cl⁻ | Red. |
| 50 | [O₂N—⌬(CN)—N=N—⌬(OCH₃)—N(CH₃)(C₂H₄—N⁺C₅H₅)] Cl⁻ | Claret. |
| 51 | [O₂N—⌬—N=N—⌬(OCH₃, CH₃)—N(CH₃)(C₂H₄—N⁺C₅H₅)] Cl⁻ | Red. |
| 52 | [O₂N—⌬(Cl)—N=N—⌬(OCH₃, CH₃)—N(H)(C₂H₄—N⁺C₅H₅)] Br⁻ | Claret. |
| 53 | [O₂N—⌬(Cl)—N=N—⌬(OCH₃, CH₃)—N(H)(C₂H₄—N⁺C₅H₅)] Cl⁻ | Do. |
| 54 | [O₂N—⌬(Cl,Cl)—N=N—⌬(OCH₃, CH₃)—N(H)(C₂H₄—N⁺C₅H₅)] Cl⁻ | Brown. |

TABLE—Continued

| Dyestuff | | Shade |
|---|---|---|
| 55 | [O₂N—⟨⟩—N=N—⟨⟩(OCH₃)(CH₃)—N(H)(C₂H₄—N⁺pyridyl)] Cl⁻, with CN on first ring | Violet. |
| 56 | [O₂N—⟨⟩(SO₂CH₃)—N=N—⟨⟩(OCH₃)(CH₃)—N(H)(C₂H₄—N⁺pyridyl)] Cl⁻ | Do. |
| 57 | [O₂N—⟨⟩(SO₂CH₃)—N=N—⟨⟩(OCH₃)(CH₃)—N(CH₃)(C₂H₄—N⁺pyridyl)] Cl⁻ | Do. |
| 58 | [CH₃SO₂—⟨⟩(Cl)—N=N—⟨⟩(CH₃)(CH₃)—N(H)(C₂H₄—N⁺pyridyl)] Cl⁻ | Orange. |
| 59 | [CH₃SO₂—⟨⟩(Cl)—N=N—⟨⟩(OCH₃)(CH₃)—N(CH₃)(C₂H₄—N⁺pyridyl)] Cl⁻ | Do. |
| 60 | [O₂N—⟨⟩(Cl)—N=N—⟨⟩(OCH₃)(OCH₃)—N(H)(C₂H₄—N⁺pyridyl)] Cl⁻ | Red. |
| 61 | [O₂N—⟨⟩(Cl)—N=N—⟨⟩(OCH₃)(OCH₃)—N(H)(C₂H₄—N⁺pyridyl)] Cl⁻ | Claret. |
| 62 | [O₂N—⟨⟩(CN)—N=N—⟨⟩(OCH₃)(CH₃)—N(CH₃)(C₂H₄—N⁺pyridyl)] Cl⁻ | Violet. |
| 63 | [O₂N—⟨⟩(O—⟨⟩—Cl)—N=N—⟨⟩(CH₃)—N(C₂H₅)(C₂H₄—N⁺pyridyl)] Cl⁻ | Red. |
| 64 | [CH₃CO—⟨⟩—N=N—⟨⟩—N(C₂H₅)(C₂H₄—N⁺pyridyl)] Br⁻ | Orange. |
| 65 | [O₂N—⟨⟩—N=N—⟨⟩(NHCOCH₃)—N(CH₃)(CH₂CH₂—N⁺pyridyl)] Cl⁻ | Red. |
| 66 | [O₂N—⟨⟩(Cl)(Cl)—N=N—⟨⟩(NHCOCH₃)—N(CH₃)(CH₂CH₂—N⁺pyridyl)] Cl⁻ | Brown. |
| 67 | [O₂N—⟨⟩(Cl)—N=N—⟨⟩—N(C₂H₅)(C₂H₄—N(CH₂—CH₂)(CH₂—CH₂))] | Red. |

TABLE—Continued

| Dyestuff | | Shade |
|---|---|---|
| 68 | $[O_2N-C_6H_4-N=N-C_6H_4-N(C_2H_5)(C_2H_4-N(CH_2CH_2)_2O)]$ | Orange. |
| 69 | $[O_2N-C_6H_2Cl_2-N=N-C_6H_4-N(C_2H_5)(C_2H_4-N(CH_2CH_2)_2CH_2)]$ | Yellow-brown. |
| 70 | $[O_2N-C_6H_4-N=N-C_6H_3(CH_3)-N(C_2H_5)(C_2H_4-N^+(CH_3)(CH_2CH_2)_2)]$ Cl⁻ | Orange. |
| 71 | $[O_2N-C_6H_2(CN)(OCH_3)(CH_3)-N=N-C_6H_4-N(CH_3)(CH_2CH_2-N^+(CH_3)(CH_2CH_2)_2)]$ $C_7H_7SO_3$ | Violet. |
| 72 | $[CH_3SO_2-C_6H_3Cl-N=N-C_6H_4-N(C_2H_5)(C_2H_4-N^+(CH_3)(CH_2CH_2)_2O)]$ Cl⁻ | Orange. |
| 73 | $O_2N-C_6H_3(SO_2CH_3)-N=N-C_6H_3(OCH_3)-N(CH_3)(C_2H_4-N(CH_2CH_2)_2CH_2)$ | Claret. |
| 74 | $[O_2N-C_6H_3Cl-N=N-C_6H_4-N(CH_3)(C_2H_4-N^+(CH_3)(CH_2CH_2)_2)]$ Cl⁻ | Red. |
| 75 | $[O_2N-C_6H_2Cl_2-N=N-C_6H_4-N(C_2H_5)((CH_2)_3-N^+C_5H_5)]$ Cl⁻ | Yellow-brown. |
| 76 | $O_2N-C_6H_3Cl-N=N-C_6H_3(CH_3)-N(C_2H_5)((CH_2)_3-N(CH_2CH_2)_2O)$ | Red. |
| 77 | $[O_2N-C_6H_4-N=N-C_6H_2(OCH_3)(CH_3)-N(CH_3)((CH_2)_3-N^+(CH_3)(CH_2CH_2)_2O)]$ Br⁻ | Red. |
| 78 | $[O_2N-C_6H_3(CN)-N=N-C_6H_2(OCH_3)(CH_3)-N(CH_3)((CH_2)_3-N^+C_5H_5)]$ Cl⁻ | Violet. |
| 79 | $[O_2N-C_6H_4-N=N-C_6H_3(CH_2CH_2)N(CH_2CH_2-N^+C_5H_5)]$ Cl⁻ | Red. |

TABLE—Continued

| Dyestuff | Shade |
|---|---|
| 80 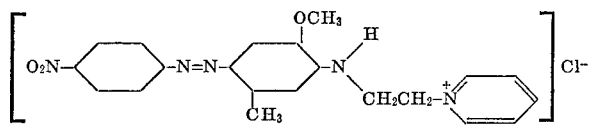 | Brown. |
| 81 | Red. |
| 82 | Violet. |

EXAMPLE 2

(Continuous dyeing)

A padding liquor is prepared from 40 parts of the dyestuff of the formula

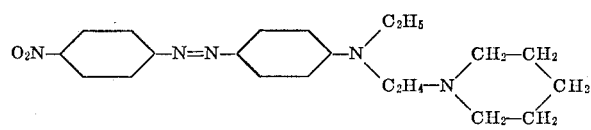

40 parts of 80% acetic acid, 3 parts of a locust bean thickener and 1,000 parts of water. A fabric made from polyacrylonitrile fibres is impregnated with this liquor at 50° C., squeezed to a weight increase of 100% and then steamed at 100° C. for 45 minutes in a continuous steamer. The fabric is then thoroughly rinsed and dried. The resulting red dyeing has good fastness to light and sublimation.

The dyestuffs mentioned in Example 1 may be used in an identical manner.

EXAMPLE 3

(High-temperature dyeing)

2 parts of the dyestuff of the formula

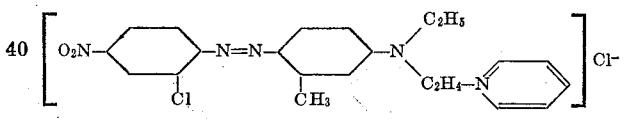

are dissolved in 3,000 parts of water containing 1 part of crystalline sodium acetate, 5 parts of calcined sodium sulphate and adjusted with acetic acid to a pH value of 4.5 to 5. Then 100 parts of polyacrylonitrile filament yarn are immersed in this dyebath at 80° C., the temperature is raised within 45 minutes to a maximum of 120° C. and the yarn is dyed at 120° C. for 30 minutes, slowly cooled and rinsed. The resulting strong, orange dyeing has excellent fastness to light and sublimation.

The dyestuffs mentioned in Example 1 may be used in an identical manner.

EXAMPLE 4

(Printing)

A printing paste is prepared from 20 parts of the dyestuff of the formula 50 parts of 40% acetic acid, 20 parts of thiodiethyleneglycol and 600 parts of a 50% gum arabic thickening, and the whole is made up to 1,000 parts with water. A polyacrylonitrile fabric is printed with this paste, dried and then subjected for 30 minutes to saturated steam under 0 to 0.75 atmosphere (gauge) pressure. The fabric is then washed and dried. A red print is obtained which is fast to light.

The dyestuffs mentioned in Example 1 may be used in an identical manner.

What is claimed is:

1. A process for coloring polyacrylonitrile or polyvinylidenecyanide fibres, wherein a mono or disazo dyestuff is used which is free from acidic groups imparting solubility in water, and corresponds to the formula

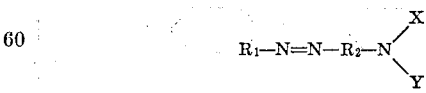

wherein $R_1$ represents a phenyl or a phenylazophenyl radical which, when it contains a halogen atom in 2-position to the azo group and a member selected from the group consisting of an alkanecarbonyl, alkanesulphonyl and alkylated aminosulphonyl group in 4-position, must contain no further halogen atom in 5- or 6-position and, when it contains a halogen atom in 2-position and a nitro group in 4-position, must contain no nitro group in 6-position to the azo group, $R_2$ represents a benzene radical linked with the azo bridge in para-position to the amino group, X represents a member selected from the group consisting of a hydrogen, methyl-, ethyl-, benzyl-, phenyl-, or cyclohexyl-group, and Y represents methylene, ethylene or propylene radical to which a member selected from the group consisting of the cyclic nitrogen atom of a heterocyclic tertiary amine and the cyclic nitrogen atom of a heterocyclic quaternary amine is directly bound to an alkyl carbon atom, and wherein N and X together with $R_2$ may form a tetrahydroquinoline or benzmorpholine residue.

2. A process as claimed in claim 1 wherein a dyestuff of the given formula is used in which Y represents a pyridiniumethyl radical.

3. A process as claimed in claim 1 wherein there is used a dyestuff of the formula

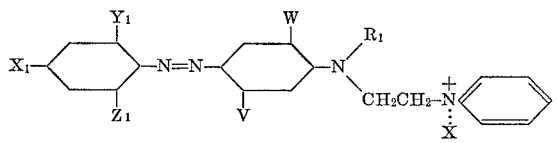

wherein $X_1$ represents a member selected from the group consisting of hydrogen, halogen, a cyano, carbalkoxy, phenylazo, alkanesulphonyl and nitro group, $Y_1$ and $Z_1$ each represent a member selected from the group consisting of hydrogen, halogen, a nitro, methyl, methoxy, ethoxy, trifluoromethyl, carbalkoxy and cyano group, and at least one of the radicals $X_1$ and $Y_1$ represents a member selected from the group consisting of nitro, carbalkoxy and cyano group and wherein the radical of the diazo component does not contain a halogen atom in ortho-position to the azo-bridge when it contains a nitro-group in para-position and in the other ortho-position of the azo-bridge, V represents a member selected from the group consisting of hydrogen, halogen, methyl, methoxy and ethoxy, W represents a member selected from the group consisting of hydrogen, methyl, methoxy and ethoxy, $R_1$ represents a member selected from the group consisting of methyl, ethyl, cyclohexyl and benzyl, and X represents an anion.

4. A process as claimed in claim 3, wherein X in the given formula represents a halogen ion.

5. A process as claimed in claim 1 wherein there is used a dyestuff of the formula

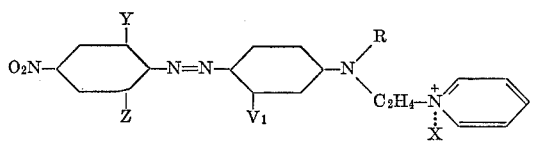

wherein Y represents a member selected from the group consisting of halogen and a cyano group, Z is a member selected from the group consisting of hydrogen and halogen, $V_1$ is a member selected from the group consisting of hydrogen and methyl, R is methyl or ethyl and X is an anion.

6. A process as claimed in claim 5, wherein X in the given formula represents a halogen ion.

7. A process as claimed in claim 1, wherein there is used the dyestuff of the formula

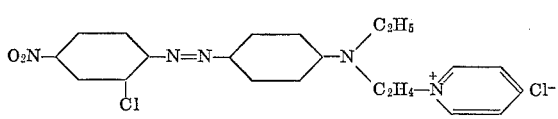

8. A process as claimed in claim 1, wherein there is used the dyestuff of the formula

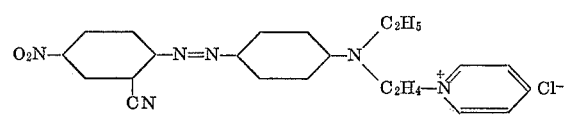

9. A process as claimed in claim 1, wherein there is used the dyestuff of the formula

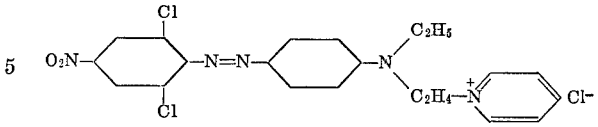

10. A process as claimed in claim 1, wherein there is used the dyestuff of the formula

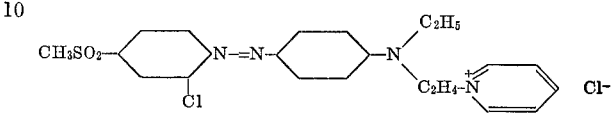

11. A process as claimed in claim 1, wherein there is used the dyestuff of the formula

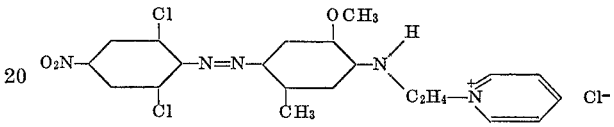

12. A process as claimed in claim 1, wherein there is used the dyestuff of the formula

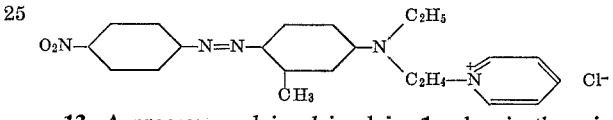

13. A process as claimed in claim 1, wherein there is used the dyestuff of the formula

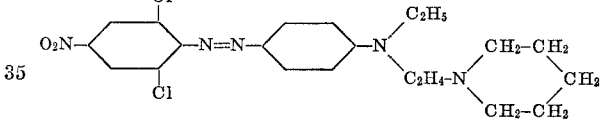

14. A process as claimed in claim 1, wherein there is used the dyestuff of the formula

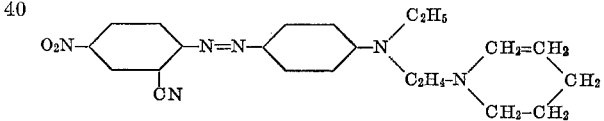

15. A process as claimed in claim 1, wherein there is used the dyestuff of the formula

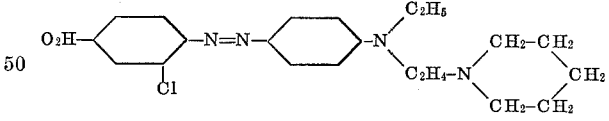

16. A process as claimed in claim 1, wherein there is used the dyestuff of the formula

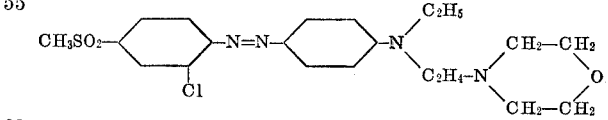

References Cited

FOREIGN PATENTS 652,215  10/1937  Germany.

OTHER REFERENCES

Lubs, Chem. Syn. Dyes & Pigments, 1955, pp. 167–169.
Trotman, Dyeing & Chem. Tech. of Text. Fibers, 1964, p. 521.

GEORGE F. LESMES, Primary Examiner

T. J. HERBERT, JR., Assistant Examiner

U.S. Cl. X.R.

8—177

UNITED STATES PATENT OFFICE
CERTIFICATE OF CORRECTION

PO-1050
(5/69)

Patent No. 3,529,921   Dated September 22, 1970

Inventor(s) GERT HEGAR ET AL

It is certified that error appears in the above-identified patent and that said Letters Patent are hereby corrected as shown below:

Column 22, Claim 15, the left hand side of the formula should read:

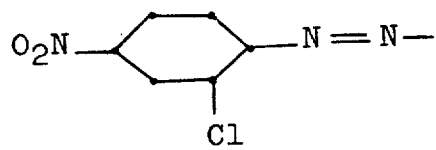

Signed and sealed this 11th day of May 1971.

(SEAL)
Attest:

EDWARD M. FLETCHER, JR.
Attesting Officer

WILLIAM E. SCHUYLER, JR.
Commissioner of Patents